(12) United States Patent
Zhang et al.

(10) Patent No.: US 11,943,033 B2
(45) Date of Patent: Mar. 26, 2024

(54) FULL-DUPLEX BEAM PAIR RESELECT USING BEAM MANAGEMENT REPORT

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 200 days.

(21) Appl. No.: 17/488,237

(22) Filed: Sep. 28, 2021

(65) Prior Publication Data

US 2022/0103228 A1    Mar. 31, 2022

Related U.S. Application Data

(60) Provisional application No. 63/085,987, filed on Sep. 30, 2020.

(51) Int. Cl.
| | | |
|---|---|---|
| *H04W 72/04* | (2023.01) | |
| *H04B 7/06* | (2006.01) | |
| *H04B 17/336* | (2015.01) | |
| *H04L 1/1867* | (2023.01) | |
| *H04L 5/14* | (2006.01) | |
| *H04W 24/10* | (2009.01) | |

(52) U.S. Cl.
CPC ......... *H04B 7/0695* (2013.01); *H04B 17/336* (2015.01); *H04L 1/1896* (2013.01); *H04L 5/14* (2013.01); *H04W 24/10* (2013.01)

(58) Field of Classification Search
CPC ...... H04B 7/0695; H04B 7/063; H04B 7/088; H04B 17/336; H04L 1/1896; H04L 5/14; H04L 5/0023; H04L 5/0082; H04L 5/0092; H04W 24/10
See application file for complete search history.

(56) References Cited

U.S. PATENT DOCUMENTS

| | | | | |
|---|---|---|---|---|
| 11,271,699 | B1* | 3/2022 | Eyuboglu | H04B 7/0691 |
| 11,375,527 | B1* | 6/2022 | Eyuboglu | H04B 7/15528 |
| 2017/0346535 | A1* | 11/2017 | Islam | H04B 7/0426 |
| 2018/0034531 | A1* | 2/2018 | Sadiq | H04B 7/0408 |
| 2018/0083679 | A1* | 3/2018 | Lim | H04B 17/336 |
| 2018/0227898 | A1* | 8/2018 | Noh | H04B 7/088 |
| 2019/0081687 | A1* | 3/2019 | Sadiq | H04W 76/19 |
| 2019/0349915 | A1 | 11/2019 | Ahn et al. | |
| 2020/0052753 | A1 | 2/2020 | Raghavan et al. | |

(Continued)

OTHER PUBLICATIONS

International Search Report and Written Opinion—PCT/US2021/052703—ISA/EPO—dated Feb. 2, 2022.

*Primary Examiner* — Mahbubul Bar Chowdhury
(74) *Attorney, Agent, or Firm* — Procopio, Cory, Hargreaves & Savitch LLP

(57) ABSTRACT

Methods and apparatus to reselect a full-duplex beam pair using a beam management report include transmitting a beam management report that reports a set of one or more candidate full-duplex beam pairs from a UE to a base station. Methods and apparatus also include determining when to apply a full-duplex beam pair from the set of one or more candidate full-duplex beam pairs after transmitting the beam management report from the UE to the base station, and applying the full-duplex beam pair at a determined time.

30 Claims, 10 Drawing Sheets

(56) References Cited

U.S. PATENT DOCUMENTS

| | | | |
|---|---|---|---|
| 2020/0374960 A1* | 11/2020 | Deenoo | H04W 74/0833 |
| 2022/0053353 A1* | 2/2022 | Lee | H04W 24/08 |
| 2022/0069884 A1* | 3/2022 | Zhang | H04W 76/11 |
| 2022/0264318 A1* | 8/2022 | Nilsson | H04W 16/28 |
| 2022/0345195 A1* | 10/2022 | Jang | H04B 7/0404 |
| 2023/0132757 A1* | 5/2023 | Kang | H04W 16/28 |
| | | | 370/329 |

* cited by examiner

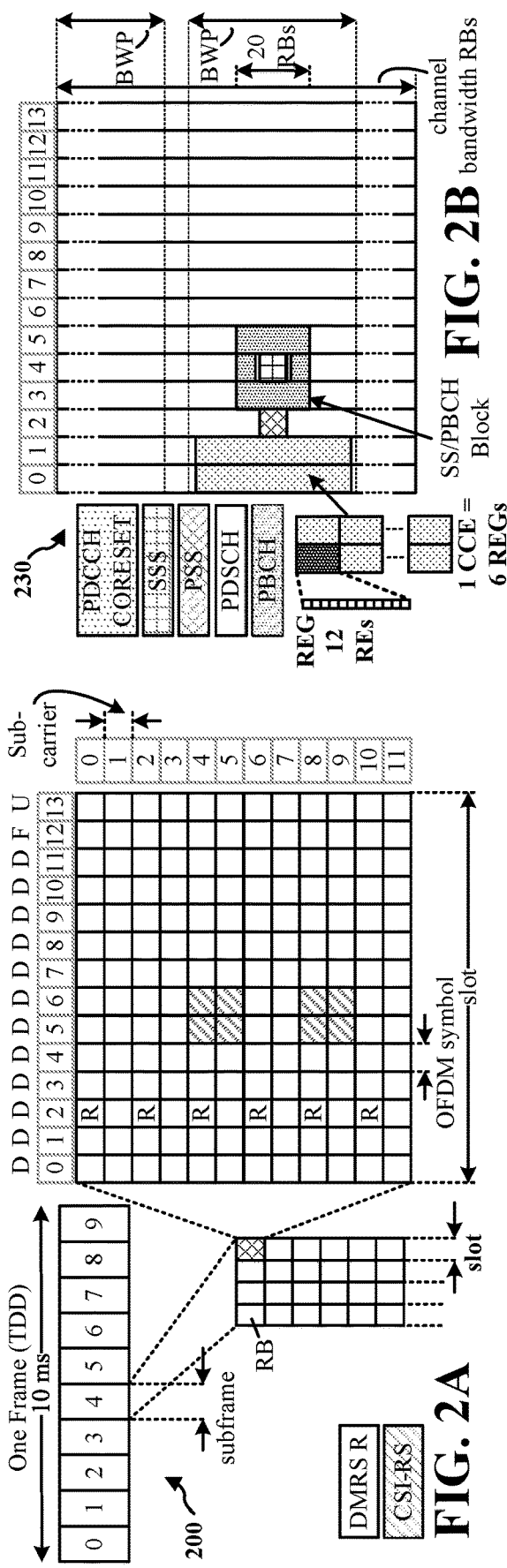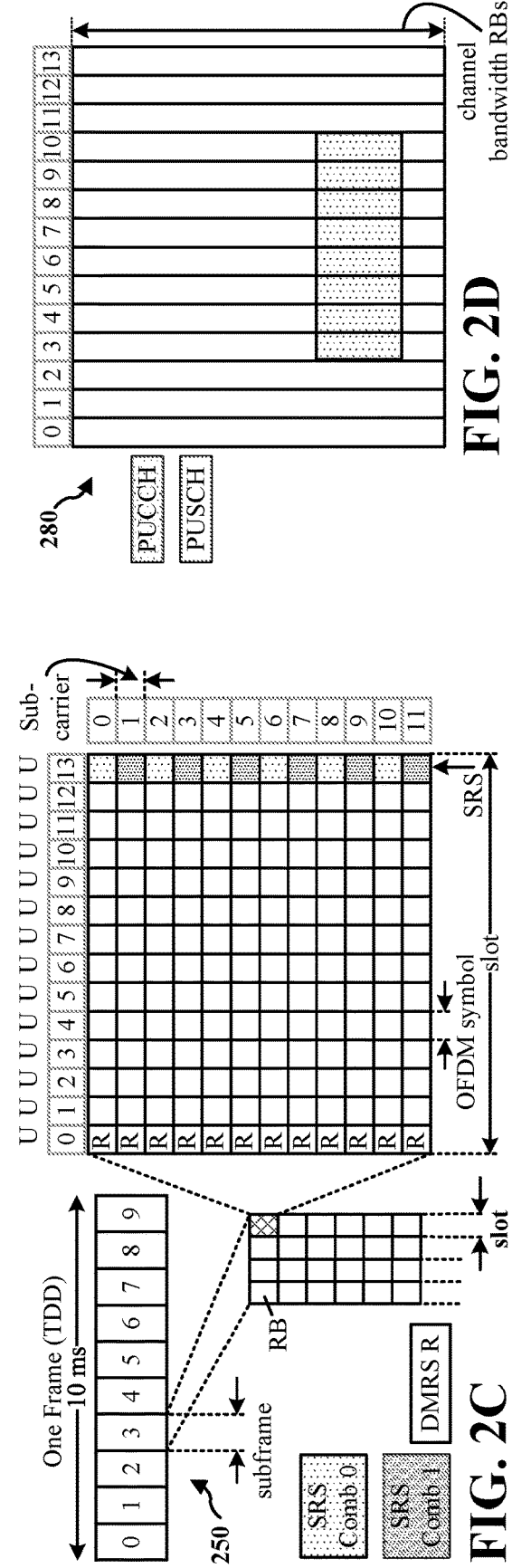

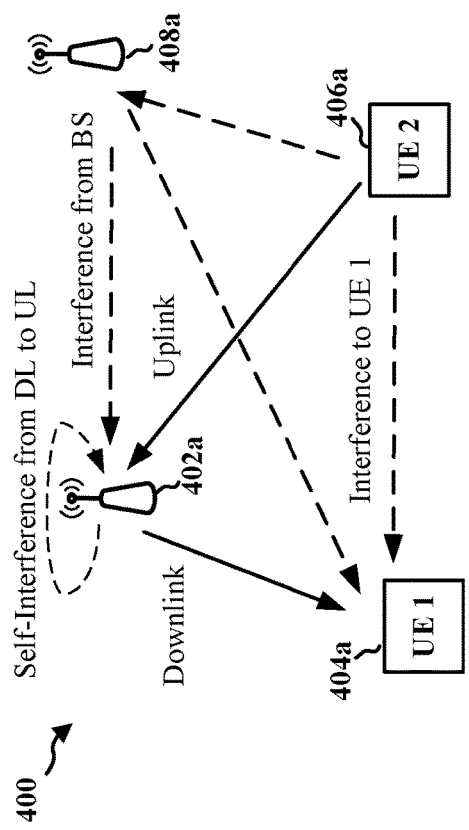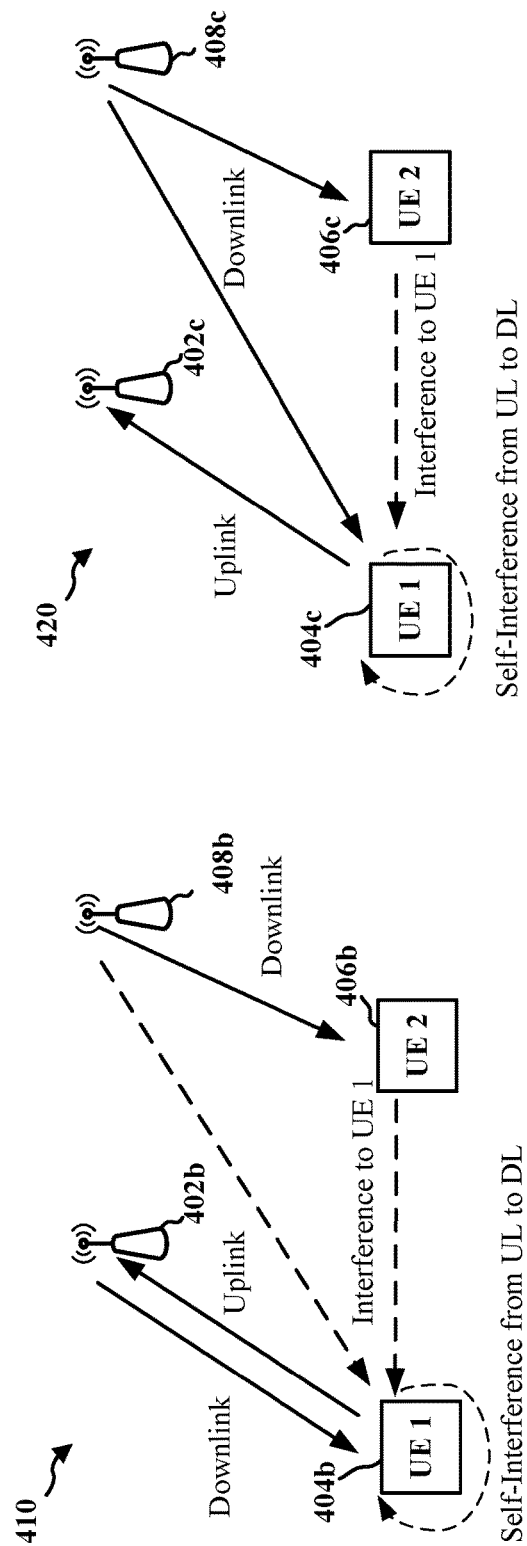
FIG. 4A
FIG. 4B
FIG. 4C

FULL-DUPLEX BEAM PAIR RESELECT USING BEAM MANAGEMENT REPORT

CROSS REFERENCE TO RELATED APPLICATION(S)

This application claims the benefit of and priority to U.S. Provisional Application Ser. No. 63/085,987, entitled "Full Duplex Beam Pair Reselect Using Beam Management Report" and filed on Sep. 30, 2020, which is expressly incorporated by reference herein in its entirety.

TECHNICAL FIELD

The present disclosure relates generally to communication systems, and more particularly, to wireless communication based on directional beams.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, methods and apparatus for wireless communication at a user equipment (UE) are provided. An apparatus includes: means for transmitting a beam management report that reports a set of one or more candidate full-duplex beam pairs to a base station; and means for applying a full-duplex beam pair from the set of one or more candidate full-duplex beam pairs at a determined time after transmitting the beam management report to the base station.

In an aspect of the disclosure, methods and apparatus for wireless communication at a base station are provided. The apparatus includes: means for receiving, from a UE, a beam management report that reports a set of one or more candidate full-duplex beam pairs for the UE; and means for applying a full-duplex beam pair from the set of one or more candidate full-duplex beam pairs at a determined time after receiving the beam management report from the UE.

To the accomplishment of the foregoing and related ends, the one or more aspects comprise the features hereinafter fully described and particularly pointed out in the claims. The following description and the annexed drawings set forth illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 4A, 4B, and 4C illustrate example diagrams of full-duplex wireless communication.

DETAILED DESCRIPTION

Figure 1:
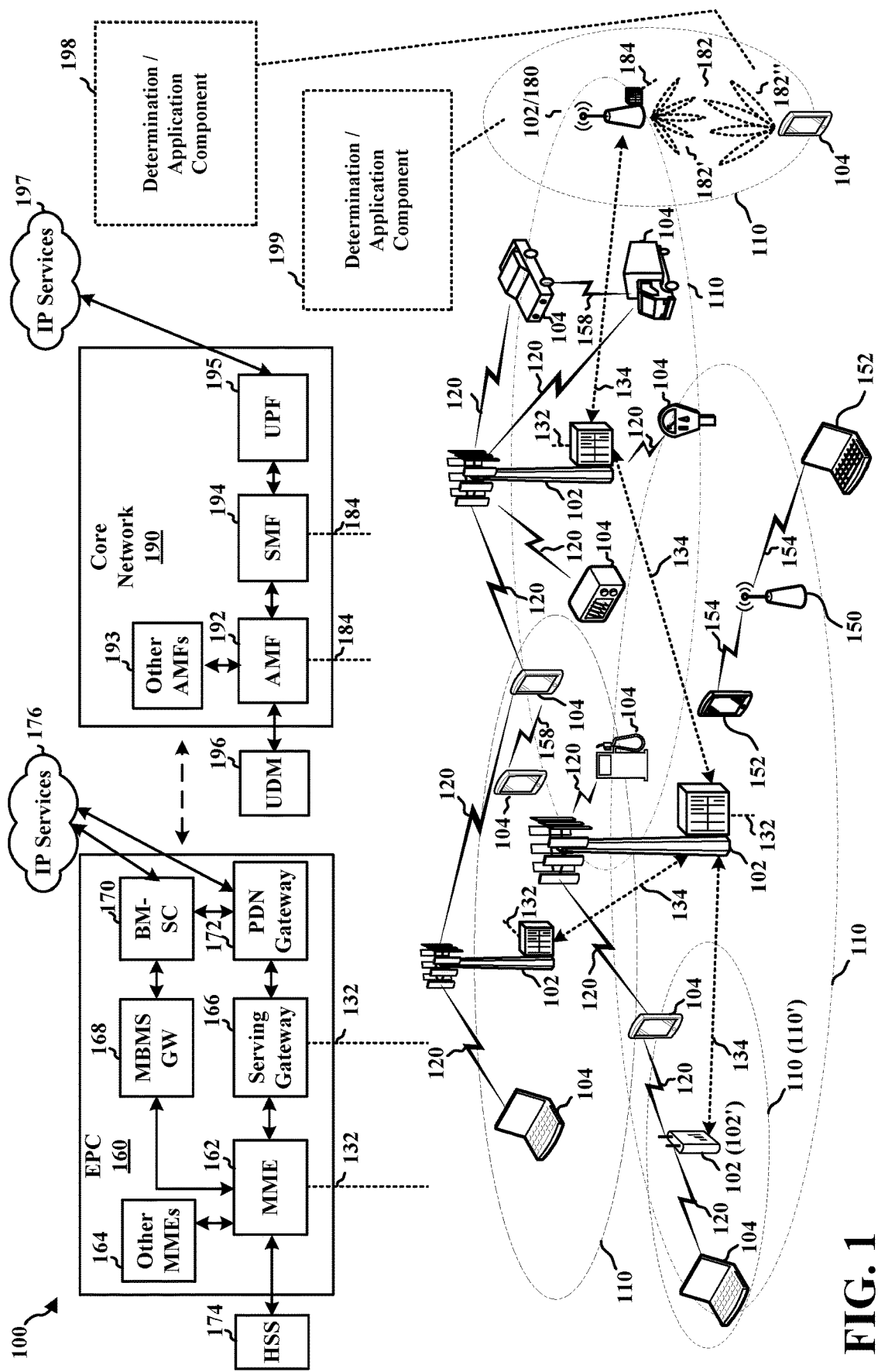
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) illustrates base stations 102 or 180, UEs 104, an Evolved Packet Core (EPC) 160, and another core network 190 (e.g., a 5G Core (5GC)). A UE 104 and/or a base station 102 or 180 may communicate in a full-duplex mode in which uplink communication and downlink communication is exchanged in a same frequency band at overlapping times. The UE and the base station may exchange communication using one or more directional beams.

For example, beamforming 182 may be used between a base station 180 and a UE 104 to compensate for the path loss and short range in millimeter wave (mmW) communication. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions.

A beam between the UE 104 and the base station 180 may become blocked, which may lead to downlink and/or uplink beam degradation leading to a beam failure. A UE 104 or a base station 102 or 180 operating in a full-duplex mode may experience self-interference for a beam that leads to a beam failure for downlink communication. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

Aspects presented herein enable latency reduction (i.e., it is possible to receive DL signal in UL only slots), improved spectrum efficiency, and improved resource utilization by providing full-duplex communication with the ability to reselect a full-duplex beam pair using a beam management report.

For example, a UE 104 may include a determination/application component 198 configured to transmit a beam management report that reports a set of one or more candidate full-duplex beam pairs to the base station and applies a full-duplex beam pair from the set of one or more candidate full-duplex beam pairs after transmitting the beam management report to the base station. In some examples, the component 198 may also be configured to determine when to apply a full-duplex beam pair from the set of one or more candidate full-duplex beam pairs after transmitting the beam management report to the base station.

A base station 102 or 180 may include a determination/application component 199 configured to receive a beam management report that reports a set of one or more candidate full-duplex beam pairs to the base station and configured to apply a full-duplex beam pair from the set of one or more candidate full-duplex beam pairs after receiving the beam management report. The component 199 may also be configured to determine when to apply a full-duplex beam pair from the set of one or more candidate full-duplex beam pairs after receiving the beam management report from the UE.

Although the following description may be focused on 5G NR, the concepts described herein may be applicable to other similar areas, such as LTE, LTE-A, CDMA, GSM, and other wireless technologies.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30

GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations 180, such as a gNB may operate in a traditional sub 6 GHz spectrum, in millimeter wave frequencies, and/or near millimeter wave frequencies in communication with the UE 104. When the gNB (e.g., the base station 180) operates in millimeter wave or near millimeter wave frequencies, the gNB may be referred to as a millimeter wave base station. The millimeter wave base station (e.g., the base station 180) may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| µ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies µ 0 to 4 allow for 1, 2, 4, 8, and 16 slots, respectively, per subframe. For extended CP, the numerology 2 allows for 4 slots per subframe. Accordingly, for normal CP and numerology µ, there are 14 symbols/slot and $2^\mu$ slots/subframe. The subcarrier spacing may be equal to $2^\mu*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of normal CP with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
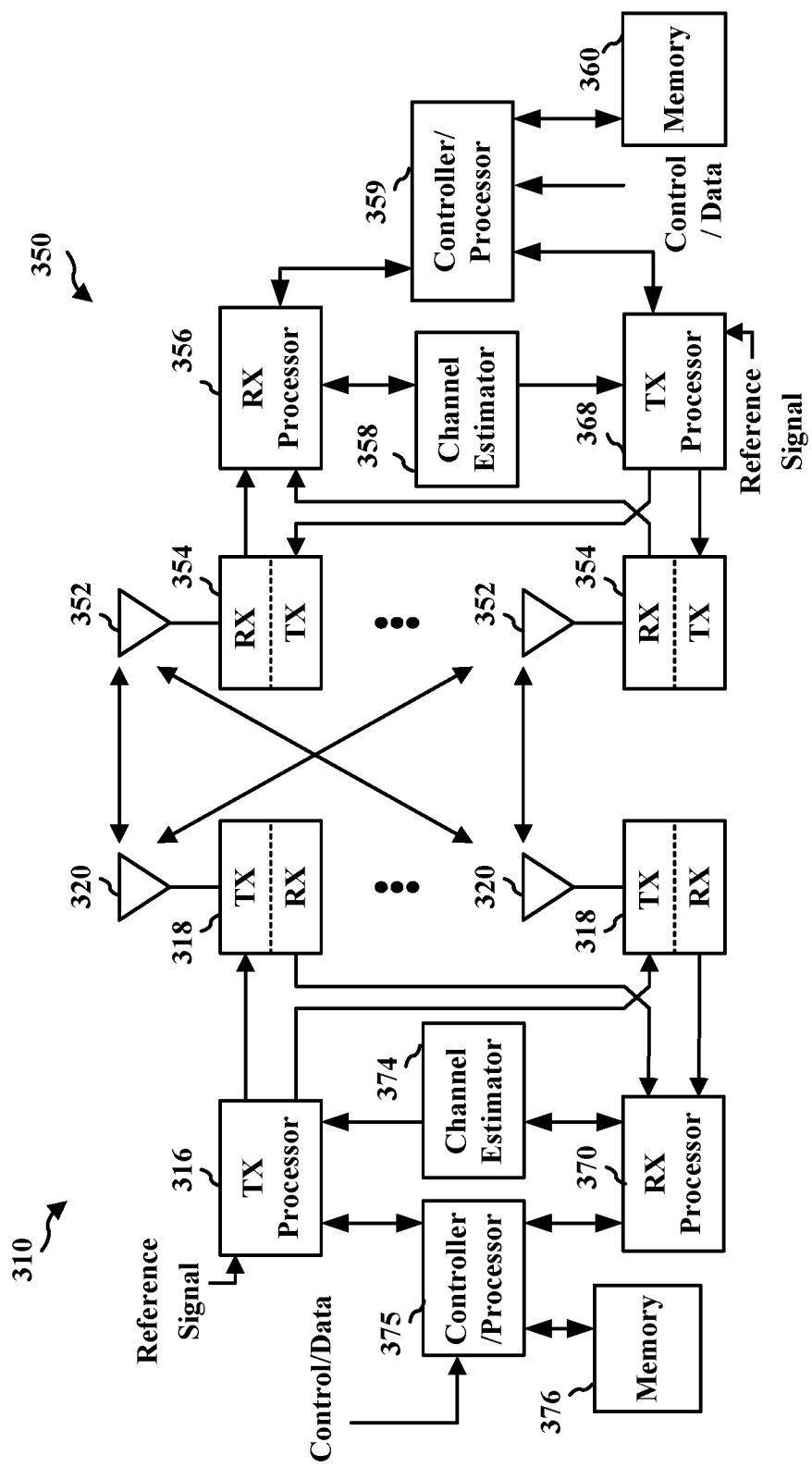
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the determination/application component 198 of FIG. 1.

At least one of the TX processor 316, the RX processor 370, and the controller/processor 375 may be configured to perform aspects in connection with the determination/application component 199 of FIG. 1.

Wireless communication systems may be configured to share available system resources and provide various telecommunication services (e.g., telephony, video, data, messaging, broadcasts, etc.) based on multiple-access technologies that support communication with multiple users. Full-duplex operation in which a wireless device exchanges uplink and downlink communication that overlaps in time may enable more efficient use of the wireless spectrum. Full-duplex operation may include simultaneous transmission and reception in a same frequency range. In some examples, the frequency range may be a mmW frequency range, e.g., frequency range 2 (FR2). In some examples, the frequency range may be a sub-6 GHz frequency range, e.g., frequency range 1 (FR1). Full-duplex capability may be supported at a base station and/or a UE. For example, a UE may transmit uplink communication from one antenna panel and may receive downlink communication with another antenna panel. In some examples, the full-duplex communication may be conditional on beam separation or other conditions.

Full-duplex communication may reduce latency. For example, full-duplex operation may enable a UE to receive a downlink signal in an uplink only slot, which can reduce the latency for the downlink communication. Full-duplex communication may improve spectrum efficiency, e.g., spectrum efficiency per cell or per UE. Full-duplex communication may enable more efficient use of wireless resources.

FIGS. 4A-4C illustrate various modes of full-duplex communication. Full-duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full-duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full-duplex communication 400 in which a first base station 402a is in full-duplex communication with a first UE 404a and a second UE 406a. The first UE 404a and the second UE 406a may be configured for half-duplex communication or full-duplex communication. FIG. 4A illustrates the first UE 404a performing downlink reception, and the second UE 406a performing uplink transmission. The second UE 406a may transmit a first uplink signal to the first base station 402a as well as to other base stations, such as a second base station 408a in proximity to the second UE 406a. The first base station 402a transmits a downlink signal to the first UE 404a concurrently (e.g., overlapping at least partially in time) with receiving the uplink signal from the second UE 406a. The base station 402a may experience self-interference at its receiving antenna that is receiving the uplink signal from UE 406a, the self-interference being due to reception of at least part of the downlink signal transmitted to the UE 404a. The base station 402a may experience additional interference due to signals from the second base station 408a. Interference may also occur at the first UE 404a based on signals from the second base station 408a as well as from uplink signals from the second UE 406a.

FIG. 4B shows a second example of full-duplex communication 410 in which a first base station 402b is in full-duplex communication with a first UE 404b. In this example, the UE 404b is also operating in a full-duplex mode. The first base station 402b and the UE 404b receive and transmit communication that overlaps in time and is in a same frequency band. The base station and the UE may each experience self-interference, due to a transmitted signal from the device leaking to (e.g., being received by) a receiver at the same device. The first UE 404b may experience additional interference based on one or more signals emitted from a second UE 406b and/or a second base station 408b in proximity to the first UE 404b.

FIG. 4C shows a third example of full-duplex communication 420 in which a first UE 404c transmits and receives full-duplex communication with a first base station 402c and a second base station 408c. The first base station 402c and the second base station 408c may serve as multiple transmission and reception points (multi-TRPs) for UL and DL communication with the UE 404c. The second base station 408c may also exchange communication with a second UE 406c. In FIG. 4C, the first UE 404c may transmit an uplink signal to the first base station 402c that overlaps in time with receiving a downlink signal from the second base station 408c. The first UE 404c may experience self-interference as a result of receiving at least a portion of the first signal when receiving the second signal, e.g., the UE's uplink signal to the base station 402c may leak to (e.g., be received by) the UE's receiver when the UE is attempting to receive the signal from the other base station 408c. The first UE 404c may experience additional interference from the second UE 406c.

Figure 5:
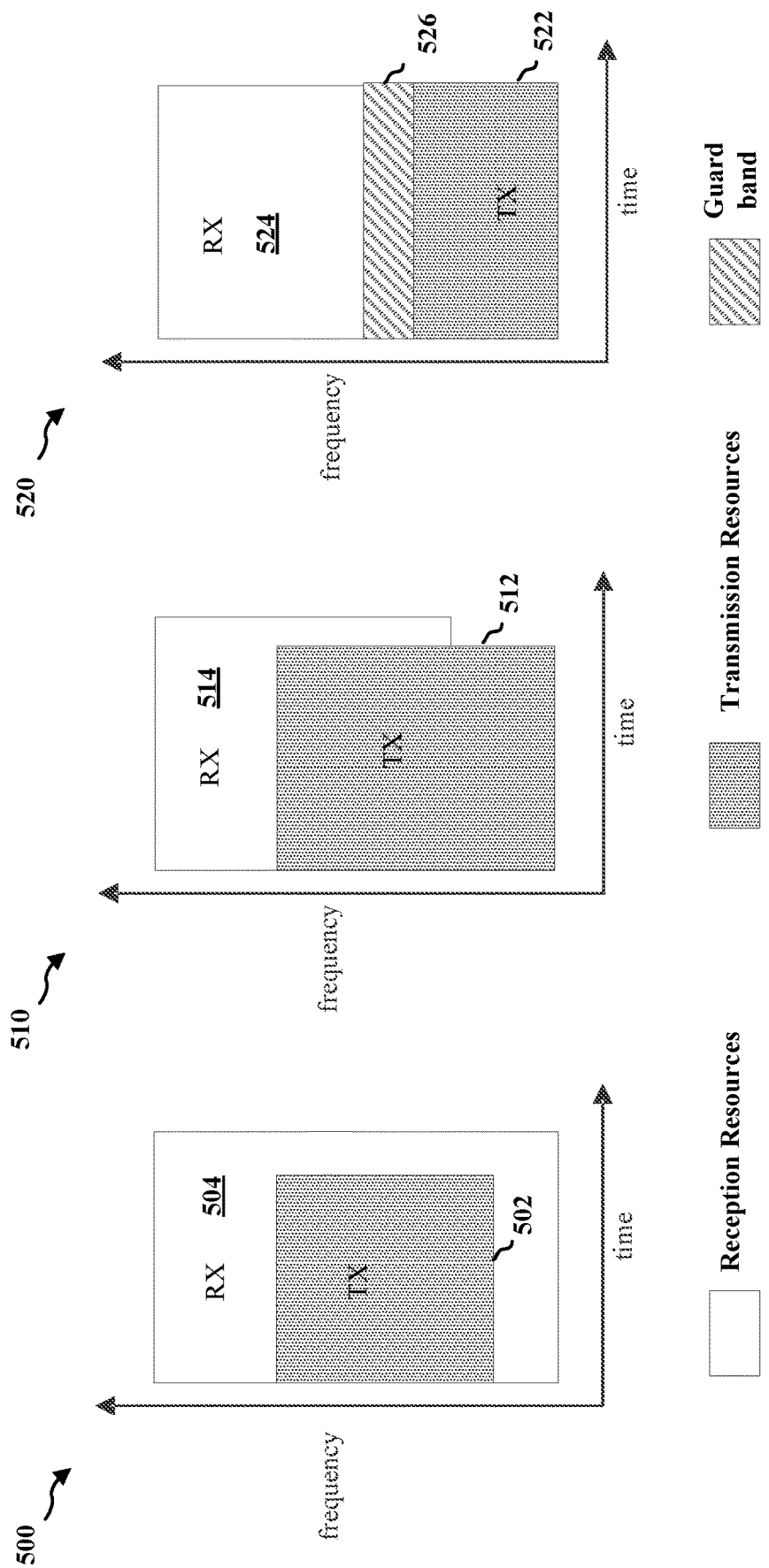
FIG. 5 illustrates examples of in-band full-duplex (IBFD) resources and sub-band frequency division duplex (FDD) resources for full-duplex communication.

Full-duplex communication may be in a same frequency band. The uplink and downlink communication may be in different frequency subbands, in the same frequency subband, or in partially overlapping frequency subbands. FIG. 5 illustrates a first example 500 and a second example 510 of in-band full-duplex (IBFD) resources and a third example 520 of sub-band full-duplex resources. In IBFD, signals may be transmitted and received in overlapping times and overlapping in frequency. As shown in the first example 500, a time and a frequency allocation of transmission resources 502 may fully overlap with a time and a frequency allocation of reception resources 504. In the second example 510, a time and a frequency allocation of transmission resources 512 may partially overlap with a time and a frequency of allocation of reception resources 514.

IBFD is in contrast to sub-band FDD, where transmission and reception resources may overlap in time using different frequencies, as shown in the third example 520. In the third example 520, the UL, the transmission resources 522 are separated from the reception resources 524 by a guard band

526. The guard band may be frequency resources, or a gap in frequency resources, provided between the transmission resources 522 and the reception resources 524. Separating the transmission frequency resources and the reception frequency resources with a guard band may help to reduce self-interference. Transmission resources and a reception resources that are immediately adjacent to each other may be considered as having a guard band width of 0. As an output signal from a wireless device may extend outside the transmission resources, the guard band may reduce interference experienced by the wireless device. Sub-band FDD may also be referred to as "flexible duplex".

If the full-duplex operation is for a UE or a device implementing UE functionality, the transmission resources 502, 512, and 522 may correspond to uplink resources, and the reception resources 504, 514, and 524 may correspond to downlink resources. Alternatively, if the full-duplex operation is for a base station or a device implementing base station functionality, the transmission resources 502, 512, and 522 may correspond to downlink resources, and the reception resources 504, 514, and 524 may correspond to uplink resources.

As described in connection with FIG. 1, a UE 104 and a base station 102 or 180 may use beamforming 182 to exchange downlink and uplink communication using directional beams. After determination of a beam for communication, conditions may change and may cause a beam to fail. For example, a UE may experience a beam failure if a user moves to a location that blocks the beam to the base station. For example, the UE may move to a different orientation or may move around a corner, or may move to a location in which a building or other structure blocks the beam. In other examples, the surrounding environment may change, e.g., a vehicle may move to a position that blocks the beam between the UE and the base station. If the current beam used by the UE becomes unreliable, the UE may switch to a new beam. The UE may monitor the quality of the beam and may perform radio link monitoring (RLM) in order to detect a reduction in the beam quality.

For example, a UE may monitor a quality of a signal received via reception beam(s). Measurements for RLM, e.g., of downlink signals, may be performed by a physical (PHY) layer of the UE based on one or more RLM reference signals. The PHY layer may pass the RLM measurements to a medium access control (MAC) layer and radio resource control (RRC) layer. The RRC layer may be responsible for detecting a radio link failure (RLF), and the MAC layer may be responsible for detecting beam failures.

For monitoring active link performances, a UE may perform measurements of at least one signal, e.g., reference signals, for beam failure detection. The measurements may include deriving a metric similar to a Signal to Interference plus Noise Ratio (SINR) for the signal, or RSRP strength or block error rate (BLER) of a reference control channel chosen by base station and/or implicitly derived by UE based on the existing RRC configuration. The reference signal may comprise any of CSI-RS, Physical Broadcast Channel (PBCH), a synchronization signal, or other reference signals for time and/or frequency tracking, etc. In some cases, the UE may determine a configured metric such as block error rate (BLER) for a reference signal. The measurement(s) may indicate the UE's ability to transmit an uplink transmission to the base station using the beam.

Figure 6:
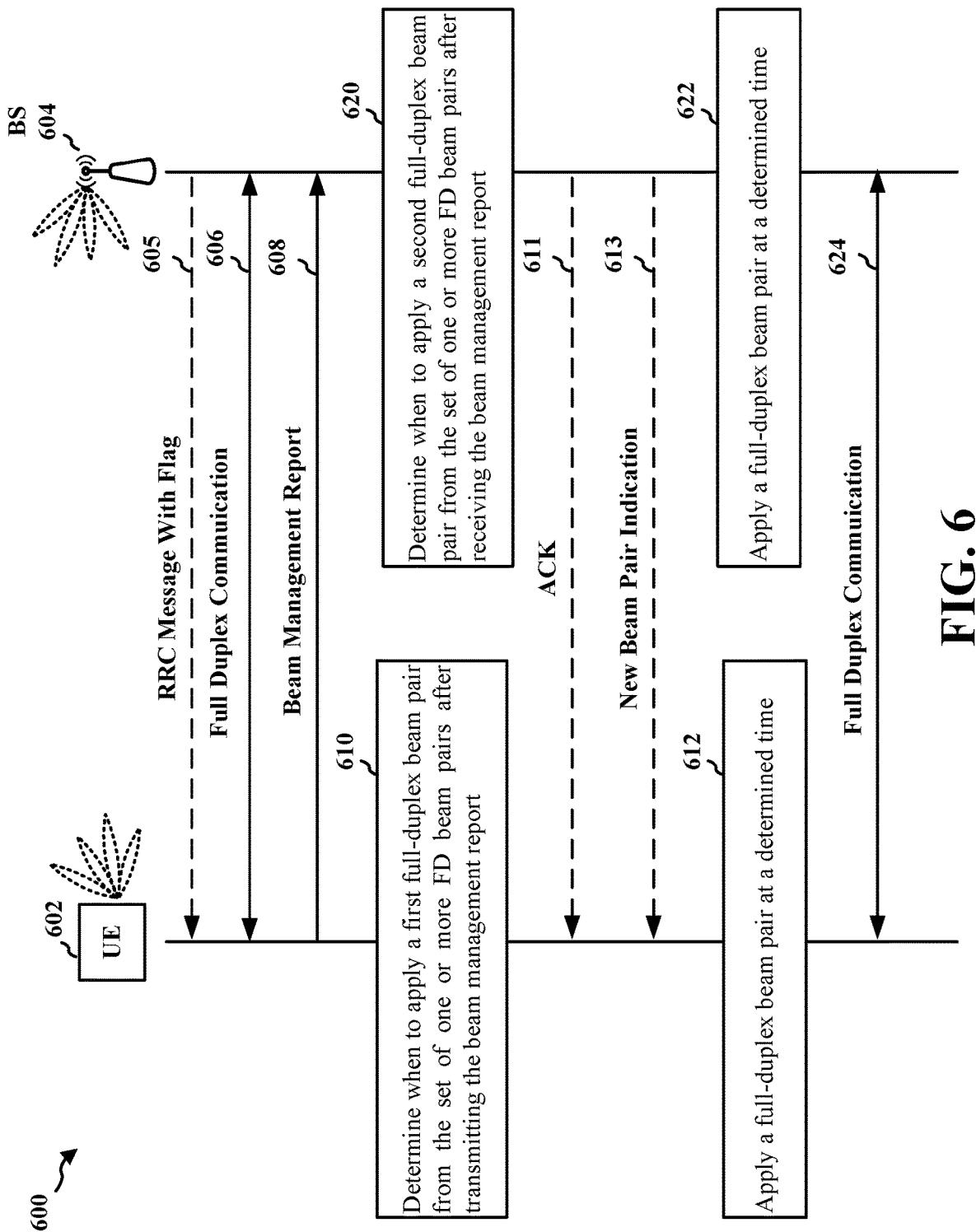
FIG. 6 illustrates an example communication flow between a UE and a base station that may reselect a full-duplex beam pair using a beam management report in accordance with aspects of the disclosure.

FIG. 6 illustrates an example communication flow 600 between a UE 602 and a base station 604 that may reselect a full-duplex beam pair using a beam management report based on RLM measurements of a reference signal in accordance with some aspects of the disclosure. The UE 602 may correspond to UE 104 in FIG. 1, UE 350 in FIG. 3, UE 404a, 404b, 404c, 406a, 406b, or 406c in FIG. 4A, 4B, or 4C. The base station 604 may correspond to base station 102, 180, 310, 402a, 402b, 402c, 408a, 408b, or 408c.

In FIG. 6, the UE 602 and the base station 604 may use beamforming with at least one active downlink and uplink beam pair for full-duplex communication 606. As beam conditions may change, the UE may continue to perform measurements, e.g., Layer 1 beam management. For full-duplex communication, the UE may perform measurements for one or more beam pairs, e.g., a pair of an uplink beam for transmitting uplink communication and a downlink beam for receiving downlink communication in a full-duplex manner. The UE 602 may perform measurements based on one or more DL and UL reference signals for each beam, e.g., CSI-RS or SSB for a downlink beam and a self-interference measurement based on SRS transmitting from the uplink beam. The base station 604 may configure channel measurement resources (CMRs) and interference measurement resources (IMRs) to perform the SINR measurements. The CMRs measure the downlink channel quality and the IMRs measure the self-interference from the uplink beam to its own downlink beam at the UE. With the CMRs and the IMRs, the UE measures the SINR values per uplink and downlink beam pair. The UE may perform measurements for each possible combination of beams, e.g., each candidate beam pair. The UE may report measurements to the base station for a set of one or more candidate beam pair combinations for full-duplex communication having the best SINR values based on the channel and self-interference measurements. For example, the UE may report the top N best full-duplex candidate beam pairs that have the highest SINR values, N being an integer number. N may be configured by the base station or may be a defined number. The report may be referred to as a beam management report.

The UE 602 may transmit to the base station 604 and the base station 604 may receive from the UE 602, a beam management report that reports a set of one or more candidate full-duplex beam pairs, at 608.

As presented herein, the UE may apply a rule, condition, or configuration to determine when to apply a candidate beam pair from the beam management report. In some examples, the UE may determine the rule from a set of multiple rules/options for applying a new full-duplex beam pair following a beam management report. The UE 602 may determine, at 610, when to apply one of the full-duplex beam pairs from the set of one or more candidate full-duplex beam pairs after transmitting the beam management report to the base station 604. For example, the UE may apply the beam pair having the highest SINR measurement value among the reported beam pair candidates. The base station 604 may also determine, at 620, when to apply the full-duplex beam pair from the set of one or more candidate full-duplex beam pairs after receiving the beam management report from the UE 602. The UE and the base station may determine to apply the new candidate beam pair based on the same timing so that the base station and UE transmit/receive communication using the new beam pair in coordination. Aspects presented herein enable the UE and the base station to apply the new beam pair in a manner that may reduce latency and save signaling overhead. For example, in some options for application of the new beam pair, the UE may apply the new full-duplex beam pair without an explicit indication from a base station. In other examples, the UE may determine to wait for an indication from the base station before applying the new beam pair combination after providing the beam management report.

The UE 602 may then apply the new full-duplex beam pair at a first determined time, at 612, after transmitting the beam management report 608 and based on the time determined at 610. The base station 604 may similarly apply the full-duplex beam pair in the beam management report at a similarly determined time.

The UE 602 and the base station 604 may select between multiple different options for the timing to apply the new full-duplex beam pair after reporting a beam management report for a set of N best beam pair candidates for full-duplex communication.

In a first option, the UE 602 may wait for the base station 604 to provide an indication 613, such as a final new beam pair indication, via a MAC-CE or DCI to reset the full-duplex beam pair after the UE 602 sends the beam management report 608. In some aspects, the new beam pair indication 613 may indicate to the UE 602 the beam pair from the set of candidate beam pairs that the base station selects for full-duplex communication. The first option may enable the base station to control the selection of the new beam pair and the timing of the use of the new beam pair.

In a second option, after the UE 602 reports the top N candidate beam pairs in the beam management report, the UE may directly reset the full-duplex beam pair and apply the new full-duplex beam pair (e.g. reset to the top beam pair with a highest SINR value among the selected top N candidate beam pairs) without waiting for an indication from the base station 604. For example, the UE 602 may reset to the new beam pair after a period of time, such as x slots or x symbols (e.g. 28 symbols or 2 slots), following the transmission of the beam management report 608. The UE may save signaling and reduce the latency for the full-duplex beam pair reset. In the timing, x may be an integer number of slots/symbols, which may be defined in the standard spec, or may be signaled to the UE 602 by the base station via RRC, MAC-CE, and/or DCI. In this example, the UE and the base station may change beams in response to the transmission and reception of the beam management report, respectively.

In a third option, the UE 602 may apply the new beam pair based on an ACK for the beam management report. For example, after the UE 602 reports the top N candidate beam pairs, the base station 604 may send an ACK/NACK in DCI for the report. The report 608 may be sent via PUSCH or PUCCH. In this example, the UE does not wait for a new beam indication from the base station (e.g., at 613), and may instead reset and apply the new full-duplex beam pair based on the ACK 611 that informs the UE 602 that the base station 604 successfully received the beam management report 608. For example, the UE may reset to the top beam pair with a highest SINR value among the selected top N candidate beam pairs a period of time, such as after x slots or symbols (e.g. 28 symbols or 2 slots), following the base station's ACK 611 for the beam management report 608. The UE may save signaling and reduce the latency for the full-duplex beam pair reset. In the timing, x may be an integer number of slots/symbols, which may be defined or may be signaled to the UE 602 by the base station via RRC, MAC-CE, and/or DCI.

In some examples, the base station 604 may configure/signal to the UE 602 which rule among a plurality of potential rules to use to determine the timing for applying the new beam pair following the beam management report. For example, the base station may include a flag, or other indication, in the RRC message 605 that informs the UE about a timing option for application of a full-duplex beam pair after transmission of a beam management report. In some examples, a flag=0 may indicate to the UE to apply a first option (e.g., to wait for a new beam pair indication from the base station); a flag=1 may indicate to the UE apply a second option (e.g., to apply the new beam pair a period of time after sending the beam management report); and a flag=2 may indicate to the UE to apply a third option (e.g., to apply the new beam pair a period of time after receiving an ACK for the beam management report). In such examples, the flag may be based on multiple bits of the RRC message. In some examples, a flag=0 may indicate for the UE to apply a first option (e.g., to wait for a new beam pair indication from the base station); and a flag=1 may indicate for the UE to select between multiple options (e.g., between the second and third option described above). The flag may be based on a single bit in the RRC message. In some examples, the timing option that the UE and base station determine to apply, at 610 and 612, may be based on a defined rule that indicates an option for the UE to use, e.g., based on conditions.

After applying the new beam pair, at 612 and 622, the UE 602 and base station 604 may exchange full-duplex communication 624 using the new beam pair. For example, the UE may transmit uplink transmissions to the base station using a first beam of the full-duplex beam pair and may receive downlink transmissions from the base station using a second beam of the full-duplex beam pair. The UE 602 may use the beam pair to exchange communication with the base station in a full-duplex manner, e.g., such as described in connection with FIGS. 4A-C or FIG. 5. Similarly, the base station may use a first beam of the full-duplex beam pair to receive uplink transmissions from the UE and may transmit downlink transmissions to the UE using a second beam of the full-duplex beam pair.

Figure 7:
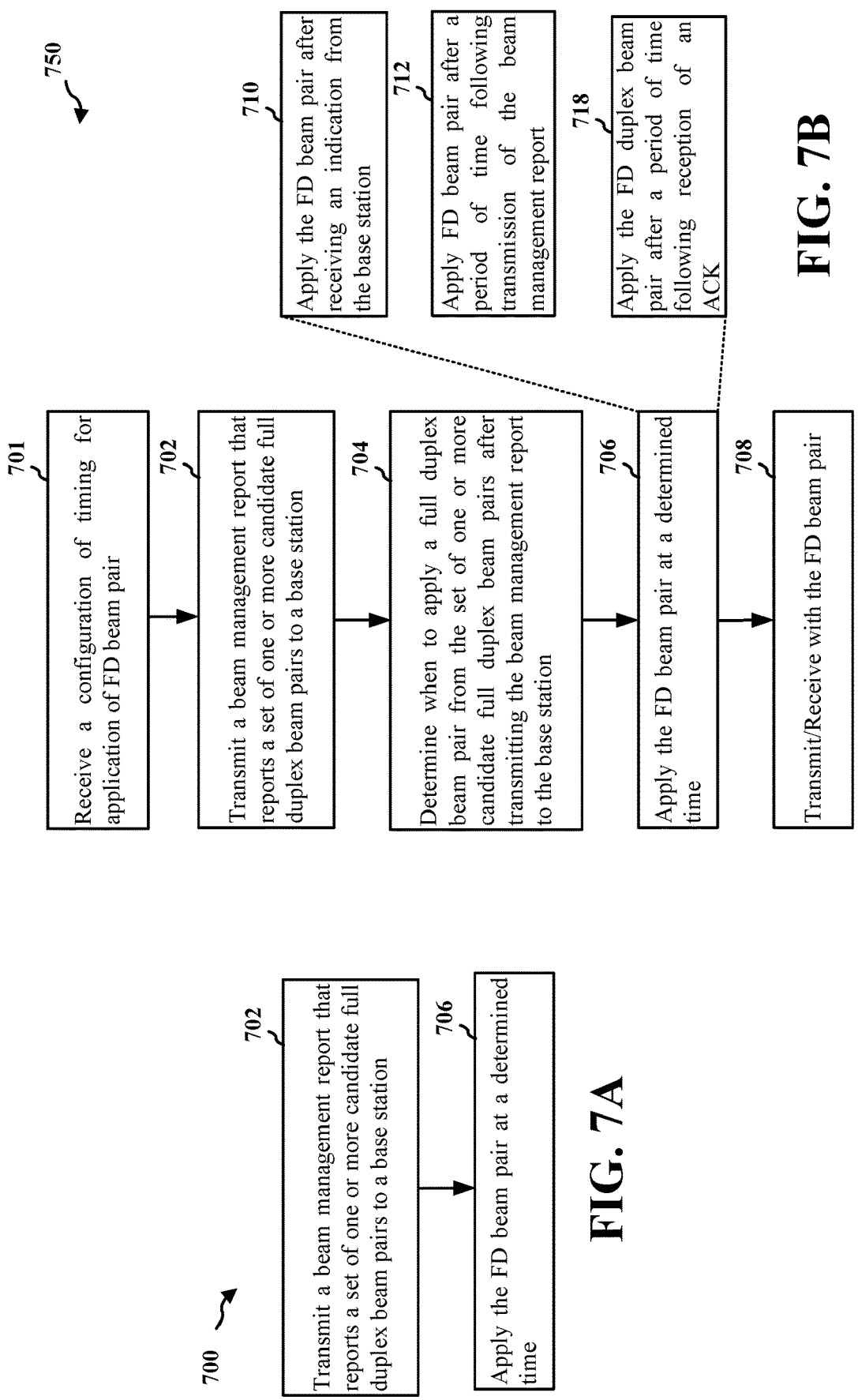
FIGS. 7A and 7B are flowcharts of methods of wireless communication using full-duplex communication in accordance with one aspect of the present disclosure.

FIG. 7A is a flowchart 700 of a method of wireless communication using full-duplex communication in accordance with one aspect of the present disclosure. The method may be performed by a UE (e.g., the UE 104, 350, 404a-c, 602; the apparatus 802). The method of FIG. 7A enables the UE to reselect a full-duplex beam pair using a beam management report.

At 702, the UE transmits a beam management report that reports a set of one or more candidate full-duplex beam pairs to a base station. In one example, 702 may be performed by a beam management report component 846 via the transmission component 834 and/or cellular RF transceiver 822 of the apparatus 802 in FIG. 8. FIG. 6 illustrates an example of the transmission of the beam management report, at 608.

At 706, the UE applies the full-duplex beam pair from the set of one or more candidate full-duplex beam pairs at a determined time after transmitting the beam management report to the base station. Various examples of timing for the application of the FD beam, at 612, are described in connection with FIG. 6. In one example, 706 may be performed by an application component 842 in FIG. 8.

In some aspects, the base station may configure CMRs and IMRs for the UE to use to perform the SINR measurements. The UE may use the CMRs to measure the downlink channel quality and the IMRs to measure the self-interference from the uplink beam to its own downlink beam at the UE. With the CMRs and the IMRs, the UE measures the SINR values per uplink and downlink beam pair, e.g., as described in connection with FIG. 6. The UE may then report the top N best full-duplex candidate beam pairs that have the highest SINR values.

In some aspects, the UE may receive a configuration from the base station that indicates timing for the UE to apply the full-duplex beam pair. FIG. 7B illustrates a method of wireless communication 750 that may include 702 and 704 from FIG. 7A. As illustrated at 701, the UE may receive a configuration from the base station that indicates the timing for the UE to apply the full-duplex beam pair. The reception may be performed, e.g., by a configuration component 844 via the reception component 830 and/or the cellular RF transceiver 822 of the apparatus 802 in FIG. 8. The configuration may indicate a rule for application of the full-duplex beam pair from among a set of rules. In another aspect, the UE may receive the configuration in RRC signaling from the base station. In another aspect, the UE determines when to apply the full-duplex beam pair based on a defined rule.

At 704, in some examples, the UE may determine when to apply a full-duplex beam pair from the set of one or more candidate full-duplex beam pairs after transmitting the beam management report to the base station. For example, the UE may determine between different timing options for applying the full-duplex beam pair after reporting the beam management report. In one example, 704 may be performed by a determination component 840 in FIG. 8. Further, FIG. 6 illustrates an example of the determination of when to apply the FD beam pair, at 610.

The determined time may be based one of: reception of a beam pair indication from the base station; transmission of the beam management report; or reception of an ACK from the base station for the beam management report. For example, the determined time to apply the full-duplex beam pair may be based on a defined rule, as illustrated at 710. In some aspects, the determined time may be based on reception of a beam pair indication from the base station, as illustrated at 712. For example, the UE may receive a beam pair indication, from the base station, indicating the full-duplex beam pair, and the determined time may be based on the reception of the beam pair indication from the base station. The determined time may be a period of time, e.g., a number of slots or symbols, following transmission of the beam management report. In some aspects, the determined time may be based on reception of an ACK from the base station acknowledging receipt of the beam management report, as illustrated at 718. For example, the UE may receive an ACK from the base station for the beam management report, where the determined time is based on reception of the ACK from the base station. The determined time may be a period of time, e.g., a number of slots or symbols, following the reception of the ACK from the base station. In one example, 708 may be performed by a determination component 840 in FIG. 8.

At 712, the UE may apply the full-duplex beam pair after a period of time following the transmission of the beam management report. In one aspect, the full-duplex beam pair has a highest measurement quality metric among the set of one or more candidate full-duplex beam pairs reported in the beam management report. In another aspect, the measurement quality metric comprises a SINR. In one example, 712 may be performed by an application component 842 in FIG. 8.

At 701, the UE may receive a configuration of the period of time in at least one of RRC signaling, a MAC-CE, or DCI. In one example, the reception of the configuration, at 702, may be performed by the configuration component 844 via the reception component 830 of the apparatus 802 in FIG. 8.

The period of time may be based on a number of slots following the transmission of the beam management report; or a number of symbols following the transmission of the beam management report.

At 718, the UE may apply the full-duplex beam pair after a period of time following the reception of the ACK from the base station. In one aspect, the full-duplex beam pair has a highest measurement quality metric among the set of one or more candidate full-duplex beam pairs reported in the beam management report. In another aspect, the measurement quality metric comprises a SINR.

As illustrated at 701, the UE may receive a configuration of the period of time in at least one of RRC signaling, a MAC-CE, or DCI. In one example, 701 may be performed by a reception component 830 in FIG. 8.

The period of time may be based on a number of slots following the transmission of the beam management report; or a number of symbols following the transmission of the beam management report. In other aspects, the UE may define the period of time as a defined period of time for application of the full-duplex beam pair.

As illustrated at 708, the UE may use the full-duplex beam pair to transmit and receive communication with the base station, e.g., in a full-duplex mode after the application of the full-duplex beam pair, at 706. The transmission and reception may be performed, e.g., by the transmission component 834 and the reception component 830 of the apparatus 802 in FIG. 8.

Figure 8:
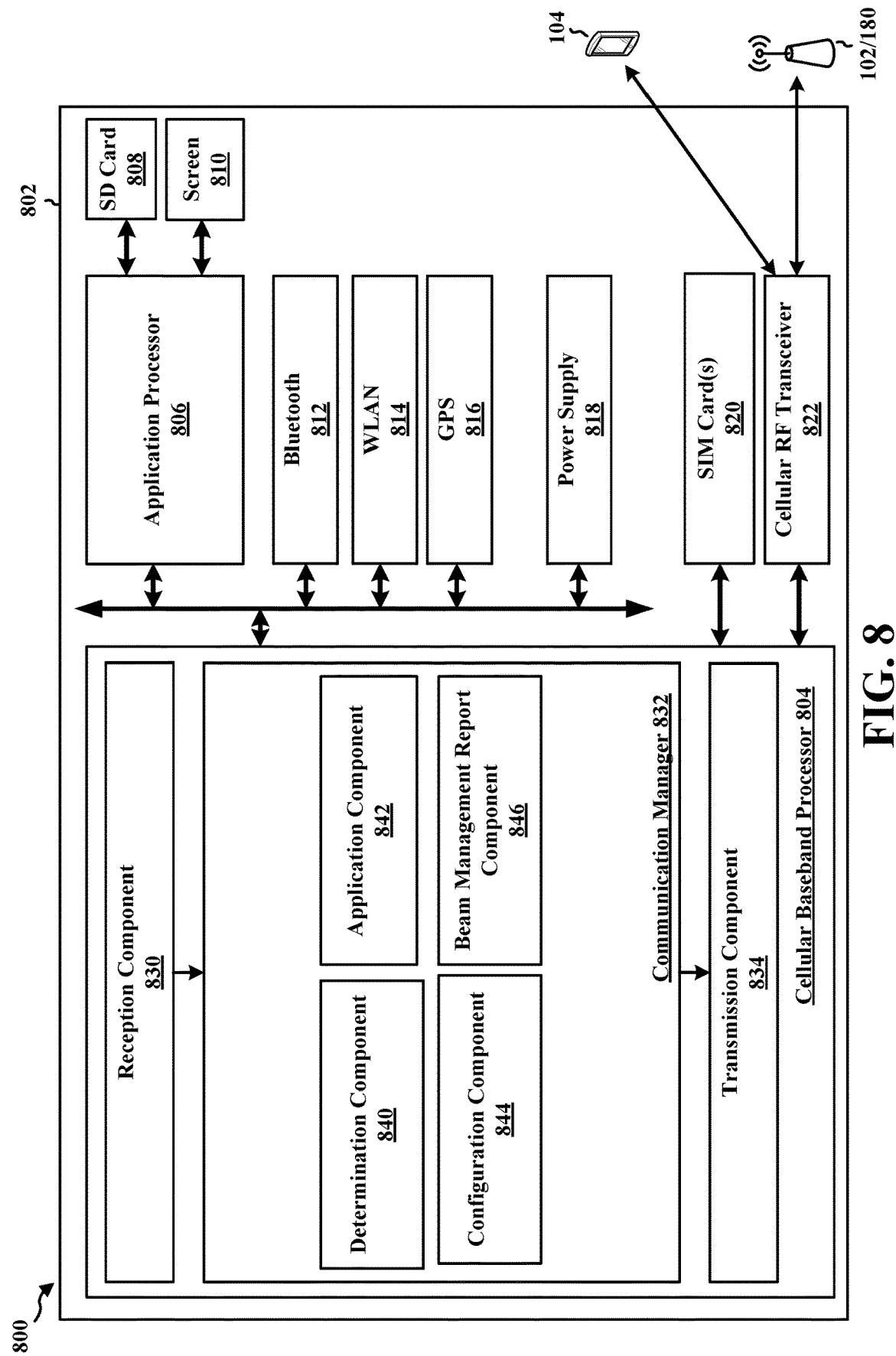
FIG. 8 is a diagram illustrating an example of a hardware implementation for an apparatus.

FIG. 8 is a diagram 800 illustrating an example of a hardware implementation for an apparatus 802. The apparatus 802 may be a UE, a component of a UE, or may implement UE functionality. In some aspects, the apparatus 802 includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the cellular baseband processor 804, and in another configuration, the apparatus

802 may be the entire UE (e.g., see 350 of FIG. 3) and include the additional modules of the apparatus 802.

The communication manager 832 includes a beam management report component 846 configured to transmit a beam management report that reports a set of one or more candidate full-duplex beam pairs to the base station, e.g., as described in connection with 702 in FIG. 7A or 7B. The communication manager 832 may include a determination component 840 that is configured to determine when to apply a full-duplex beam pair from the set of one or more candidate full-duplex beam pairs after transmitting the beam management report to the base station, e.g., as described in connection with 704 in FIG. 7B. The determination component 840 may also determine between a time based on one of after receiving a beam pair indication from the base station; after a period of time following the transmission of the beam management report; or after receiving an ACK from the base station for the beam management report. The determined time may be based on a period of time as a number of slots following the transmission of the beam management report; or a number of symbols following the transmission of the beam management report. The communication manager 832 also includes an application component 842 that is configured to apply the full-duplex beam pair at a determined time, e.g., as described in connection with 706, 710, 712, and/or 718 in FIG. 7A or 7B. In one aspect, the UE may apply the full-duplex beam pair based on receiving the beam pair indication from the base station. In another aspect, the UE may apply the full-duplex beam pair after a period of time following the transmission of the beam management report. In yet another aspect, the UE may apply the full-duplex beam pair after a period of time following the reception of the ACK from the base station. The apparatus 802 may further include a configuration component 844 that is configured to receive a configuration of the timing for application of the FD beam pair and/or the period of time in at least one of RRC signaling, a MAC-CE, or DCI, e.g., as described in connection with 701 in FIG. 7B.

The apparatus 802 may include additional components that perform each of the blocks of the algorithm in the flowcharts of FIG. 7A, 7B, and/or the aspects performed by the UE in FIG. 6. As such, each block in the flowcharts of FIGS. 7A, 7B, and/or the aspects performed by the UE in FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 802 may include a variety of components configured for various functions. In one configuration, the apparatus 802, and in particular the cellular baseband processor 804, may include: means for transmitting a beam management report that reports a set of one or more candidate full-duplex beam pairs to a base station; means for determining when to apply a full-duplex beam pair from the set of one or more candidate full-duplex beam pairs after transmitting the beam management report to the base station; and means for applying the full-duplex beam pair at a determined time. The means may be one or more of the components of the apparatus 802 configured to perform the functions recited by the means. As described supra, the apparatus 802 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 9:
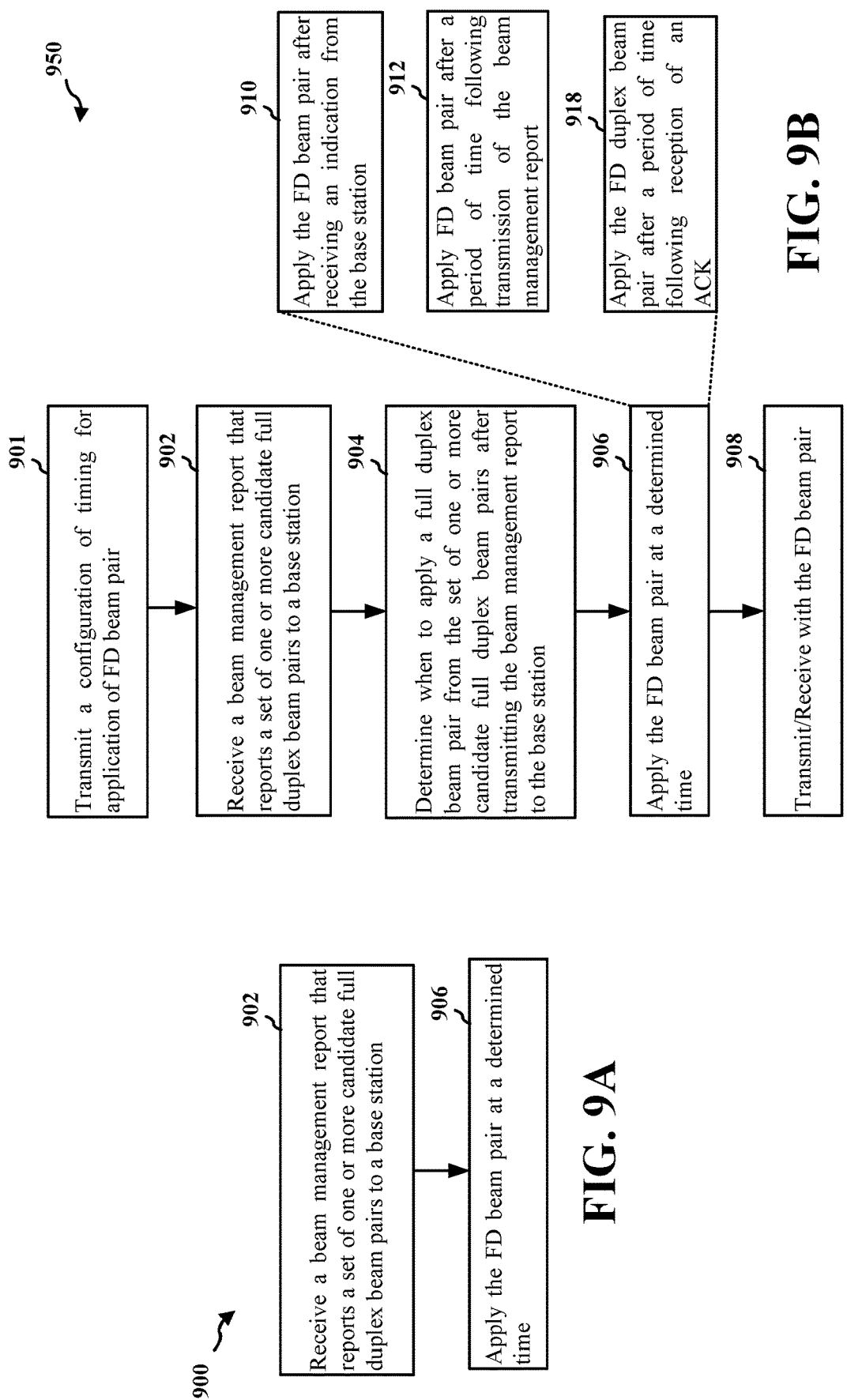
FIGS. 9A and 9B are flowcharts of methods of wireless communication using full-duplex communication in accordance with one aspect of the present disclosure.

FIG. 9A is a flowchart 900 of a method of wireless communication using full-duplex communication in accordance with one aspect of the present disclosure. The method may be performed by a base station (e.g., the base station 102/180, 310, 402a-c, 408a-c, 604; the apparatus 1002). The method enables the base station to reselect a full-duplex beam pair based on a beam management report.

At 902, the base station receives, from the UE, a beam management report that reports a set of one or more candidate full-duplex beam pairs for the UE. In one example, 902 may be performed by a beam management report component 1046 via a reception component 1030 in FIG. 10. Further, FIG. 6 illustrates an example of the reception of the beam management report by the base station, at 608.

At 906, the base station may apply the full-duplex beam pair from the set of one or more candidate full-duplex beam pairs at a determined time after receiving the beam management report from the UE. Various examples of timing for the application of the FD beam, at 622, are described in connection with FIG. 6. In one example, 906 may be performed by an application component 1042 in FIG. 10.

FIG. 9B illustrates a method of wireless communication 950 that may include 902 and 904 from FIG. 9A. In some aspects, the base station may configure CMRs and IMRs for the UE to use to perform the SINR measurements. The CMRs may be for measurement of the downlink channel quality and the IMRs may be for measurement of the self-interference from an uplink beam to reception on a downlink beam at the UE. With the CMRs and the IMRs, the UE measures the SINR values per uplink and downlink beam pair. The report received at the base station may report the top N best full-duplex candidate beam pairs that have the highest SINR values. In one aspect, the base station may transmit, e.g., as illustrated at 901, a configuration to the UE that indicates timing for the UE to apply the full-duplex beam pair. The configuration may indicate a rule for application of the full-duplex beam pair from among a set of rules. In another aspect, the base station may transmit the configuration in RRC signaling to the UE. In another aspect, the UE determines when to apply the full-duplex beam pair based on a defined rule. The configuration may be performed by the configuration component 1044 of the apparatus 1002 in FIG. 10.

At 904, in some examples, the base station may determine when to apply a full-duplex beam pair from the set of one or more candidate full-duplex beam pairs after receiving the beam management report from the UE. For example, the base station may determine a timing option from among different timing options for the application of the full-duplex beam pair. In one example, 904 may be performed by a determination component 1040 in FIG. 10. Further, FIG. 6 illustrates an example of the determination of when to apply the FD beam pair, at 620.

The determined time may be based one of: reception of a beam pair indication from the base station; transmission of the beam management report; or reception of an ACK from the base station for the beam management report. For example, the determined time to apply the full-duplex beam pair may be based on a defined rule, as illustrated at 910. In some aspects, the determined time may be based on transmission of a beam pair indication from the base station, as illustrated at 912. For example, the base station may transmit a beam pair indication to the UE indicating the full-duplex beam pair, and the determined time may be based on the transmission of the beam pair indication from the base station. The determined time may be a period of time, e.g., a number of slots or symbols, following transmission of the beam management report. In some aspects, the determined time may be based on transmission of an ACK from the base station acknowledging receipt of the beam management report, as illustrated at 918. For example, the base station may transmit an ACK for the beam management report, where the determined time is based on transmission of the ACK. The determined time may be a period of time, e.g., a number of slots or symbols, following the ACK.

At 910, the base station may apply the full-duplex beam pair based on the beam pair indication sent to the UE. In one example, 910 may be performed by an application component 1042 in FIG. 10.

At 912, the base station may apply the full-duplex beam pair after a period of time following the reception of the beam management report from the UE. In one aspect, the full-duplex beam pair has a highest measurement quality metric among the set of one or more candidate full-duplex beam pairs reported in the beam management report. In another aspect, the measurement quality metric comprises a SINR. In one example, 912 may be performed by an application component 1042 in FIG. 10.

At 901, the base station may transmit a configuration of the period of time in at least one of RRC signaling, a MAC-CE, or DCI. In one example, 901 may be performed by a configuration component 1044 in FIG. 10.

The period of time may be based on a number of slots following the reception of the beam management report; or a number of symbols following the reception of the beam management report.

At 918, the base station may apply the full-duplex beam pair after a period of time following the transmission of the ACK of the beam management report to the UE. In one aspect, the full-duplex beam pair has a highest measurement quality metric among the set of one or more candidate full-duplex beam pairs reported in the beam management report. In another aspect, the measurement quality metric includes a SINR. In one example, 918 may be performed by an application component 1042 in FIG. 10.

At 901, the base station may transmit to the UE a configuration of the period of time in at least one of RRC signaling, a MAC-CE, or DCI. In one example, 920 may be performed by a configuration component 1044 in FIG. 10. The period of time may be based on a number of slots following the reception of the beam management report; or a number of symbols following the reception of the beam management report. In other aspects, the base station may define the period of time as a defined period of time for application of the full-duplex beam pair.

As illustrated at 908, the base station may use the full-duplex beam pair to transmit and receive communication with the UE, e.g., in a full-duplex mode after the application of the full-duplex beam pair, at 906. The transmission and reception may be performed, e.g., by the transmission component 1034 and the reception component 1030 of the apparatus 1002 in FIG. 10.

Figure 10:
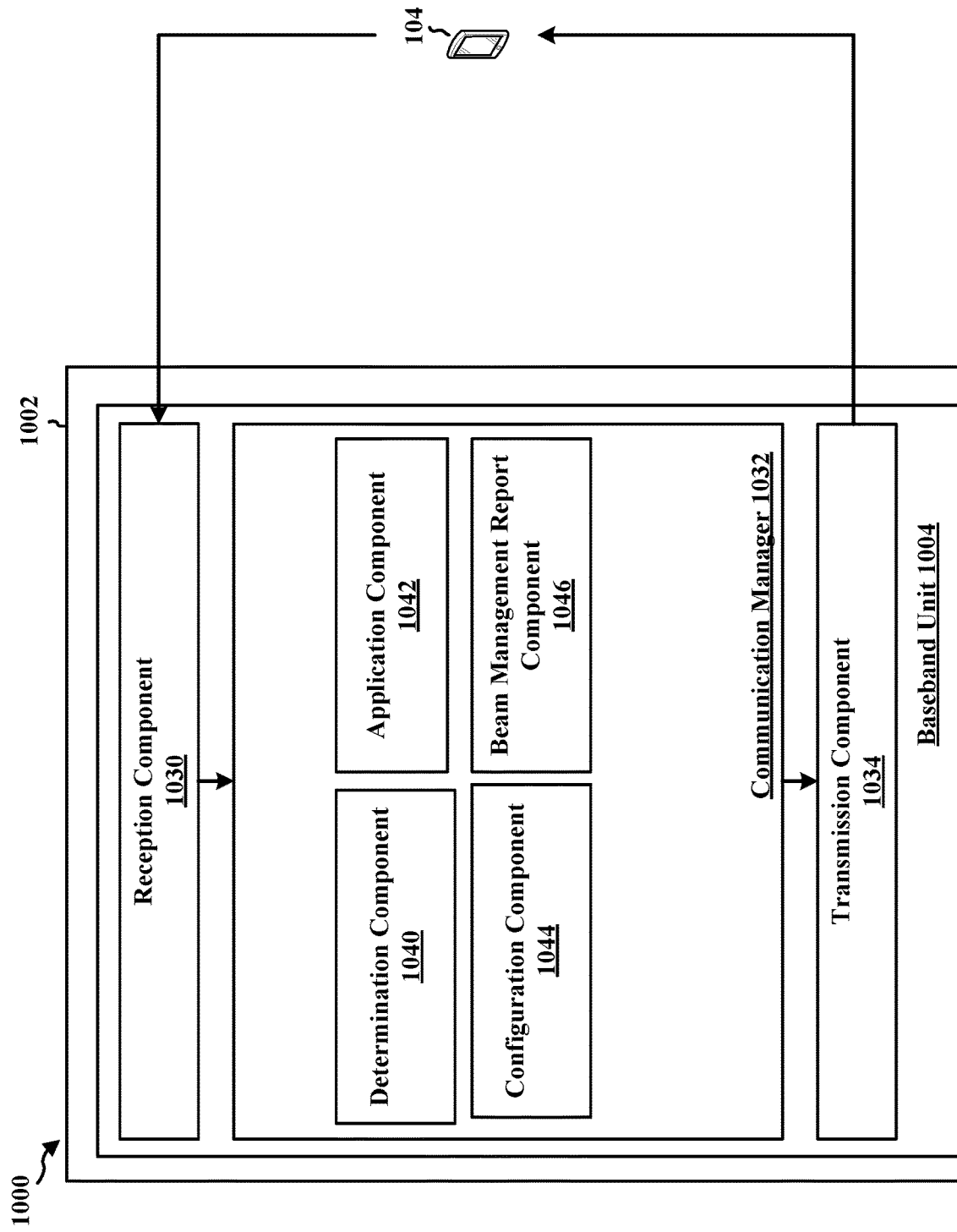
FIG. 10 is a diagram illustrating an example of a hardware implementation for an apparatus.

FIG. 10 is a diagram 1000 illustrating an example of a hardware implementation for an apparatus 1002. The apparatus 1002 may be a base station, a component of a base station, or may implement base station functionality. In some aspects, the apparatus may include a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 may include a beam management report component 1046 that is configured to receive a beam management report that reports a set of one or more candidate full-duplex beam pairs to the base station, e.g., as described in connection with 902 in FIG. 9A or 9B. The communication manager 1032 may include a determination component 1040 that is configured to determine when to apply a full-duplex beam pair from the set of one or more candidate full-duplex beam pairs after receiving the beam management report from the UE, e.g., as described in connection with 904 in FIG. 9B. The determined time may be based on one or after transmitting a beam pair indication to the UE; after a period of time following the reception of the beam management report; or after transmitting an ACK to the UE for the beam management report. The period of time may be based on a number of slots following the reception of the beam management report; or a number of symbols following the reception of the beam management report. The communication manager 1032 also includes an application component 1042 that is configured to apply the full-duplex beam pair at a determined time, e.g., as described in connection with 906, 910, 912, and/or 918 in FIG. 9A or 9B. In one aspect, the base station may apply the full-duplex beam pair based on the beam pair indication sent to the UE. In another aspect, the base station may apply the full-duplex beam pair after a period of time following the reception of the beam management report. In yet another aspect, the base station may apply the full-duplex beam pair after a period of time following the transmission of the ACK to the UE for the beam management report. The communication manager 1032 may include a configuration component 1044 that is configured to transmit a configuration of the timing for application of the full-duplex beam pair or a period of time in at least one of RRC signaling, a MAC-CE, or DCI, e.g., as described in connection with 901 in FIG. 9B.

The apparatus may include additional components that perform each of the blocks of the algorithm in the flowcharts of FIGS. 9A, 9B, and/or the aspects performed by the base station in FIG. 6. As such, each block in the flowcharts of FIGS. 9A, 9B, and/or the aspects performed by the base station in FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the baseband unit 1004, may include: means for receiving, from a user equipment (UE), a beam management report that reports a set of one or more candidate full-duplex beam pairs for the UE; means for determining when to apply a full-duplex beam pair from the set of one or more candidate full-duplex beam pairs after receiving the beam management report from the UE and means for applying the full-duplex beam pair at a determined time. The means may be one or more of the components of the apparatus 1002 configured to perform the functions recited by the means. As described supra, the apparatus 1002 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: transmitting a beam management report that reports a set of one or more candidate full-duplex beam pairs to a base station; and applying a full-duplex beam pair from the set of one or more candidate full-duplex beam pairs at a determined time after transmitting the beam management report to the base station.

In aspect 2, the method of aspect 1 further includes receiving a beam pair indication, from the base station, indicating the full-duplex beam pair, wherein the UE applies the full-duplex beam pair at the determined time based on receiving the beam pair indication.

In aspect 3, the method of aspect 1 further includes that the UE applies the full-duplex beam pair after a period of time following transmission of the beam management report.

In aspect 4, the method of any of aspects 1-3 further includes that the full-duplex beam pair has a highest measurement quality metric among the set of one or more candidate full-duplex beam pairs reported in the beam management report.

In aspect 5, the method of aspect 4 further includes that the highest measurement quality metric comprises an SINR.

In aspect 6, the method of any of aspects 1 or 3-5 further includes that the period of time comprises a number of slots following the transmission of the beam management report.

In aspect 7, the method of any of aspects 1 or 3-5 further includes that the period of time comprises a number of symbols following the transmission of the beam management report.

In aspect 8, the method of any of aspects 1 or 3-7 further includes that receiving a configuration of the period of time in at least one of RRC signaling, a MAC-CE, or DCI.

In aspect 9, the method of any of aspects 1 or 3-7 further includes that the period of time comprises a defined period of time for application of the full-duplex beam pair.

In aspect 10, the method of aspect 1 further includes receiving an ACK from the base station for the beam management report, wherein the determined time is based on reception of the ACK from the base station.

In aspect 11, the method of aspect 10 further includes that the UE applies the full-duplex beam pair after a period of time following reception of the ACK from the base station.

In aspect 12, the method of aspect 11 further includes that the full-duplex beam pair has a highest measurement quality metric among the set of the one or more candidate full-duplex beam pairs reports in the beam management report.

In aspect 13, the method of aspect 12 further includes that the measurement quality metric comprises a signal to interference and noise ratio (SINR).

In aspect 14, the method of any of aspects 10-13 further includes that the period of time comprises a number of slots following the reception of the ACK.

In aspect 15, the method of any of aspects 10-13 further includes that the period of time comprises a number of symbols following the reception of the ACK.

In aspect 16, the method of any of aspects 10-15 further includes receiving a configuration of the period of time in at least one of RRC signaling, a MAC-CE, or DCI.

In aspect 17, the method of any of aspects 10-15 further includes that the period of time comprises a defined period of time for application of the full-duplex beam pair.

In aspect 18, the method of any of aspects 1-17 further includes determining when to apply the full-duplex beam pair from the set of the one or more candidate full-duplex beam pairs after transmitting the beam management report to the base station.

In aspect 19, the method of any of aspects 1-18 further includes receiving a configuration from the base station that indicates timing for the UE to apply the full-duplex beam pair.

In aspect 20, the method of aspect 19 further includes that the configuration indicates a rule for application of the full-duplex beam pair from among a set of rules.

In aspect 21, the method of aspect 19 or aspect 20 further includes that the configuration is received in RRC signaling from the base station.

In aspect 22, the method of any of aspects 1-18 further includes that the determined time to apply the full-duplex beam pair is based on a defined rule.

Aspect 23 is an apparatus for wireless communication at a UE, comprising means to perform the method of any of aspects 1-22.

In aspect 24, the apparatus of aspect 23 further includes at least one antenna and a transceiver coupled to the at least one antenna.

Aspect 25 is an apparatus for wireless communication at a UE, comprising: memory; and at least one processor coupled to the memory, the memory and at least one processor being configured to perform the method of any of aspects 1-22.

In aspect 26, the apparatus of aspect 25 further includes at least one antenna and a transceiver coupled to the at least one antenna and the at least one processor.

Aspect 27 is a non-transitory computer-readable medium storing computer executable code for wireless communication at a UE, the code when executed by a processor cause the processor to perform the method of any of aspects 1-22.

Aspect 28 is a method of wireless communication at a base station, comprising:
receiving, from a UE, a beam management report that reports a set of one or more candidate full-duplex beam pairs for the UE; and applying a full-duplex beam pair from the set of one or more candidate full-duplex beam pairs at a determined time after receiving the beam management report from the UE.

In aspect 29, the method of aspect 28 further includes transmitting a beam pair indication, to the UE, indicating the full-duplex beam pair, wherein the determined time for application of the full-duplex beam pair is based on sending the beam pair indication.

In aspect 30, the method of aspect 28 further includes that the base station applies the full-duplex beam pair after a period of time following reception of the beam management report.

In aspect 31, the method of aspect 30 further includes the full-duplex beam pair has a highest measurement quality metric among the set of one or more candidate full-duplex beam pairs reported in the beam management report.

In aspect 32, the method of aspect 30 further includes that the highest measurement quality metric comprises a signal to interference and noise ratio (SINR).

In aspect 33, the method of any of aspects 30-32 further includes that the period of time comprises a number of slots following the reception of the beam management report.

In aspect 34, the method of any of aspects 30-32 further includes that the period of time comprises a number of symbols following the reception of the beam management report.

In aspect 35, the method of any of aspects 30-34 further includes transmitting, to the UE, a configuration of the period of time in at least one of RRC signaling, a MAC-CE, or DCI.

In aspect 36, the method of any of aspects 30-34 further includes that the period of time comprises a defined period of time for application of the full-duplex beam pair.

In aspect 37, the method of aspect 28 further includes that the base station applies the full-duplex beam pair after an ACK of the beam management report, the method further comprising: transmitting, to the UE, an ACK for the beam management report.

In aspect 38, the method of aspect 37 further includes that the base station applies the full-duplex beam pair after a period of time following transmission of the ACK from the base station.

In aspect 39, the method of any of aspects 28-38 further includes that the full-duplex beam pair has a highest measurement quality metric among the set of one or more candidate full-duplex beam pairs reported in the beam management report.

In aspect 40, the method of aspect 39 further includes that the measurement quality metric comprises a SINR.

In aspect 41, the method of any of aspects 38-40 further includes that the period of time comprises a number of slots following the transmission of the ACK.

In aspect 42, the method of any of aspects 38-40 further includes that the period of time comprises a number of symbols following the transmission of the ACK.

In aspect 43, the method of any of aspects 38-42 further includes that transmitting, to the UE, a configuration of the period of time in at least one of RRC signaling, a MAC-CE, or DCI.

In aspect 44, the method of any of aspects 38-42 further includes that the period of time comprises a defined period of time for application of the full-duplex beam pair.

In aspect 45, the method of any of aspects 28-44 further includes transmitting, to the UE, a configuration that indicates timing for the UE to apply the full-duplex beam pair.

In aspect 46, the method of aspect 45 further includes that the configuration indicates a rule for application of the full-duplex beam pair from among a set of rules.

In aspect 47, the method of aspect 45 or 46 further includes that the configuration is transmitted in RRC signaling.

In aspect 48, the method of any of aspects 28-47 further includes determining when to apply the full-duplex beam pair from the set of one or more candidate full-duplex beam pairs after receiving the beam management report from the UE.

In aspect 49, the method of any of aspects 28-48 further includes that the base station determines when to apply the full-duplex beam pair based on a defined rule.

Aspect 50 is an apparatus for wireless communication at a base station, comprising means to perform the method of any of aspects 28-49.

In aspect 51, the apparatus of aspect 50 further includes at least one antenna and a transceiver coupled to the at least one antenna.

Aspect 52 is an apparatus for wireless communication at a base station, comprising: memory; and at least one processor coupled to the memory, the memory and at least one processor being configured to perform the method of any of aspects 28-49.

In aspect 53, the apparatus of aspect 52 further includes at least one antenna and a transceiver coupled to the at least one antenna and the at least one processor.

Aspect 54 is a non-transitory computer-readable medium storing computer executable code for wireless communication at a base station, the code when executed by a processor cause the processor to perform the method of any of aspects 28-49.

What is claimed is:

1. An apparatus for wireless communication at a user equipment (UE), comprising:
   memory; and
   at least one processor coupled to the memory and configured to cause the UE to:
      receive a configuration with a field indicating a type of timing for applying a full-duplex beam pair after a beam management report, wherein a first value of the field indicates for the UE to wait for a new beam pair indication from a base station before an application of the full-duplex beam pair, and wherein a second value of the field indicates for the UE to apply the full-duplex beam pair after the beam management report without the new beam pair indication from the base station;
      measure a downlink channel quality measurement in a channel measurement resource (CMR) and a self-interference measurement in an interference measurement resource (IMR) for multiple candidate full-duplex beam pairs;
      transmit the beam management report that reports a set of one or more candidate full-duplex beam pairs to the base station based on the downlink channel quality measurement and the self-interference measurement; and
      apply the full-duplex beam pair from the set of one or more candidate full-duplex beam pairs based on the downlink channel quality measurement and the self-interference measurement for the multiple candidate full-duplex beam pairs, wherein the application of the full-duplex beam pair is at a determined time after transmitting the beam management report to the base station, the determined time being based on the type of timing indicated in the field of the configuration.

2. The apparatus of claim 1, wherein the at least one processor is further configured to cause the UE to:
   receive a beam pair indication, from the base station, indicating the full-duplex beam pair, wherein the determined time is based on reception of the beam pair indication.

3. The apparatus of claim 1, wherein the determined time is a period of time following transmission of the beam management report.

4. The apparatus of claim 3, wherein the full-duplex beam pair has a highest measurement quality metric among the set of one or more candidate full-duplex beam pairs reported in the beam management report.

5. The apparatus of claim 4, wherein the highest measurement quality metric comprises a signal to interference and noise ratio (SINR).

6. The apparatus of claim 3, wherein the period of time comprises a number of slots or symbols following the transmission of the beam management report.

7. The apparatus of claim 3, wherein the configuration of the period of time is comprised in at least one of radio resource control (RRC) signaling, a medium access control-control element (MAC-CE), or downlink control information (DCI).

8. The apparatus of claim 1, wherein the at least one processor is further configured to cause the UE to:
   receive an acknowledgement (ACK) from the base station for the beam management report, wherein the determined time is based on reception of the ACK from the base station.

9. The apparatus of claim 8, wherein the determined time is a period of time following the reception of the ACK from the base station.

10. The apparatus of claim 9, wherein the full-duplex beam pair has a highest measurement quality metric among the set of one or more candidate full-duplex beam pairs reported in the beam management report.

11. The apparatus of claim 9, wherein the period of time comprises a number of slots or symbols following the reception of the ACK.

12. The apparatus of claim 9, wherein the configuration of the period of time in at least one of radio resource control (RRC) signaling, a medium access control-control element (MAC-CE), or downlink control information (DCI).

13. The apparatus of claim 1, wherein the at least one processor is further configured to cause the UE to:
   determine when to apply the full-duplex beam pair from the set of one or more candidate full-duplex beam pairs after transmitting the beam management report to the base station.

14. The apparatus of claim 13, wherein the configuration from the base station indicates timing for the UE to apply the full-duplex beam pair.

15. The apparatus of claim 14, wherein the configuration indicates a rule for the application of the full-duplex beam pair from among a set of rules.

16. The apparatus of claim 13, wherein the determined time to apply the full-duplex beam pair is based on a defined rule.

17. A method of wireless communication at a user equipment (UE), comprising:
   receiving a configuration with a field indicating a type of timing for applying a full-duplex beam pair after a beam management report, wherein a first value of the field indicates for the UE to wait for a new beam pair indication from a base station before an application of the full-duplex beam pair, and wherein a second value of the field indicates for the UE to apply the full-duplex beam pair after the beam management report without the new beam pair indication from the base station;
   measuring a downlink channel quality measurement in a channel measurement resource (CMR) and a self-interference measurement in an interference measurement resource (IMR) for multiple candidate full-duplex beam pairs;
   transmitting the beam management report that reports a set of one or more candidate full-duplex beam pairs to the base station based on the downlink channel quality measurement and the self-interference measurement; and
   applying the full-duplex beam pair from the set of one or more candidate full-duplex beam pairs based on the downlink channel quality measurement and the self-interference measurement for the multiple candidate full-duplex beam pairs, wherein the application of the full-duplex beam pair is at a determined time after transmitting the beam management report to the base station, the determined time based on the type of timing indicated in the field of the configuration.

18. An apparatus for wireless communication at a base station, comprising:
   memory; and
   at least one processor coupled to the memory and configured to cause the base station to:
      provide a configuration to a user equipment (UE), the configuration including a field indicating a type of timing for applying a full-duplex beam pair after a beam management report, wherein a first value of the field indicates for the UE to wait for a new beam pair indication from the base station before an application of the full-duplex beam pair, and wherein a second value of the field indicates for the UE to apply the full-duplex beam pair after the beam management report without the new beam pair indication from the base station;
      configure the UE to measure a downlink channel quality measurement in a channel measurement resource (CMR) and a self-interference measurement in an interference measurement resource (IMR) for multiple candidate full-duplex beam pairs;
      receive the beam management report that reports a set of one or more candidate full-duplex beam pairs for the UE based on the downlink channel quality measurement and the self-interference measurement; and
      apply the full-duplex beam pair from the set of one or more candidate full-duplex beam pairs at a determined time after receiving the beam management report, the determined time being based on the type of timing indicated in the field of the configuration.

19. The apparatus of claim 18, wherein the at least one processor is further configured to cause the base station to:
   transmit a beam pair indication, to the UE, indicating the full-duplex beam pair, wherein the determined time for the application of the full-duplex beam pair comprises a period of time following reception of the beam management report.

20. The apparatus of claim 19, wherein the full-duplex beam pair has a highest measurement quality metric among the set of one or more candidate full-duplex beam pairs reported in the beam management report.

21. The apparatus of claim 20, wherein the highest measurement quality metric comprises a signal to interference and noise ratio (SINR).

22. The apparatus of claim 19, wherein the period of time comprises a number of slots or symbols following the reception of the beam management report.

23. The apparatus of claim 19, wherein the configuration of the period of time is comprised in at least one of radio resource control (RRC) signaling, a medium access control-control element (MAC-CE), or downlink control information (DCI).

24. The apparatus of claim 18, wherein the at least one processor is further configured to cause the base station to:
   transmit, to the UE, an acknowledgement (ACK) for the beam management report, the determined time being a period of time following transmission of the ACK from the base station.

25. The apparatus of claim 24, wherein the full-duplex beam pair has a highest measurement quality metric among the set of one or more candidate full-duplex beam pairs reported in the beam management report.

26. The apparatus of claim 24, wherein the period of time comprises a number of slots or symbols following the transmission of the ACK.

27. The apparatus of claim 18, wherein the configuration indicates timing for the UE to apply the full-duplex beam pair.

28. The apparatus of claim 18, wherein the at least one processor is further configured to cause the base station to:
   determine when to apply the full-duplex beam pair from the set of one or more candidate full-duplex beam pairs after receiving the beam management report from the UE.

29. The apparatus of claim 18, wherein the determined time to apply the full-duplex beam pair is based on a defined rule.

30. A method of wireless communication at a base station, comprising:
   providing a configuration to a user equipment (UE), the configuration including a field indicating a type of timing for applying a full-duplex beam pair after a beam management report, wherein a first value of the field indicates for the UE to wait for a new beam pair indication from the base station before an application of the full-duplex beam pair, and wherein a second value of the field indicates for the UE to apply the full-duplex beam pair after the beam management report without the new beam pair indication from the base station;
   configuring the UE to measure a downlink channel quality measurement in a channel measurement resource (CMR) and a self-interference measurement in an interference measurement resource (IMR) for multiple candidate full-duplex beam pairs;
   receiving the beam management report that reports a set of one or more candidate full-duplex beam pairs for the UE based on the downlink channel quality measurement and the self-interference measurement; and
   applying the full-duplex beam pair from the set of one or more candidate full-duplex beam pairs at a determined time after receiving the beam management report, the determined time being based on the type of timing indicated in the field of the configuration.

* * * * *